(12) United States Patent
Goldstein

(10) Patent No.: US 11,368,494 B2
(45) Date of Patent: **\*Jun. 21, 2022**

(54) AUTHENTICATION OF EMAIL SENDERS VIA AUTHORIZING DNS SERVER

(71) Applicant: ValiMail Inc., San Francisco, CA (US)

(72) Inventor: Peter Martin Goldstein, San Francisco, CA (US)

(73) Assignee: ValiMail Inc., San Francisco, CA (US)

(\*) Notice: Subject to any disclaimer, the term of this patent is extended or adjusted under 35 U.S.C. 154(b) by 0 days.

This patent is subject to a terminal disclaimer.

(21) Appl. No.: 17/500,292

(22) Filed: Oct. 13, 2021

(65) Prior Publication Data

US 2022/0038504 A1 Feb. 3, 2022

Related U.S. Application Data

(63) Continuation of application No. 17/360,322, filed on Jun. 28, 2021, which is a continuation of application
(Continued)

(51) Int. Cl.
*G06F 21/56* (2013.01)
*H04L 9/40* (2022.01)
(Continued)

(52) U.S. Cl.
CPC .............. *H04L 63/20* (2013.01); *G06F 21/56* (2013.01); *G06F 21/6218* (2013.01);
(Continued)

(58) Field of Classification Search
CPC . H04L 63/126; H04L 63/1483; H04L 63/145; H04L 63/0236; G06F 21/56; G06F 21/6218
See application file for complete search history.

(56) References Cited

U.S. PATENT DOCUMENTS

| 6,986,049 B2 | 1/2006 | Delany |
| 7,917,943 B1 | 3/2011 | Dreymann et al. |

(Continued)

FOREIGN PATENT DOCUMENTS

| CN | 1703868 A | 11/2005 |
| CN | 101217555 A | 7/2008 |

(Continued)

OTHER PUBLICATIONS

C. Deccio, C. Chen, P. Mohapatra, J. Sedayao and K. Kant, "Quality of name resolution in the Domain Name System," 2009 17th IEEE International Conference on Network Protocols, 2009, pp. 113-122. (Year: 2009).*

(Continued)

*Primary Examiner* — Kari L Schmidt
(74) *Attorney, Agent, or Firm* — Fenwick & West LLP

(57) ABSTRACT

A DNS server receives from a receiving email system, a DNS query for an email domain stored at the DNS server, the DNS query including identifying information of a sender of an email. The DNS server extracts the identifying information of the email sender from the DNS query and identifies one of a plurality of delivering organizations from the information. The DNS server determines whether the identified delivering organization is authorized to deliver email on behalf of the email domain. In response to determining that the identified delivering organization is authorized to deliver email on behalf of the email domain, the DNS server generates a target validation record based on the identity of the authorized delivering organization and the email domain, the target validation record including one or more rules indicating to the receiving email system whether the delivering organization is an authorized sender of email for the email domain.

30 Claims, 4 Drawing Sheets

Related U.S. Application Data

No. 17/128,008, filed on Dec. 19, 2020, now Pat. No. 11,057,437, which is a continuation of application No. 16/296,121, filed on Mar. 7, 2019, now Pat. No. 10,897,485, which is a continuation of application No. 15/663,771, filed on Jul. 30, 2017, now Pat. No. 10,257,231, which is a continuation of application No. 15/175,031, filed on Jun. 6, 2016, now Pat. No. 9,762,618, which is a continuation of application No. PCT/US2016/015796, filed on Jan. 29, 2016.

(60) Provisional application No. 62/116,409, filed on Feb. 14, 2015.

(51) Int. Cl.
   G06F 21/62       (2013.01)
   H04L 51/04       (2022.01)
   H04L 61/4511     (2022.01)

(52) U.S. Cl.
   CPC .......... *H04L 51/04* (2013.01); *H04L 61/1511* (2013.01); *H04L 63/0236* (2013.01); *H04L 63/08* (2013.01); *H04L 63/126* (2013.01); *H04L 63/14* (2013.01); *H04L 63/145* (2013.01); *H04L 63/1483* (2013.01)

(56) References Cited

U.S. PATENT DOCUMENTS

| | | | |
|---|---|---|---|
| 7,996,475 B2 | 8/2011 | Drako et al. | |
| 8,126,971 B2 | 2/2012 | Shuster | |
| 8,204,948 B2* | 6/2012 | Drako | H04L 51/28 709/206 |
| 8,327,128 B1 | 12/2012 | Prince et al. | |
| 8,364,773 B2 | 1/2013 | Shuster | |
| 8,538,028 B2 | 9/2013 | Yeap et al. | |
| 8,850,180 B2 | 9/2014 | Fein et al. | |
| 9,009,353 B1* | 4/2015 | Donley | H04L 61/2532 709/246 |
| 9,037,713 B2* | 5/2015 | Larson | H04L 63/0421 709/227 |
| 9,300,623 B1* | 3/2016 | Earl | H04L 61/6009 |
| 9,380,053 B1 | 6/2016 | Behnken et al. | |
| 10,171,318 B2* | 1/2019 | Pon | H04L 61/1511 |
| 10,873,596 B1* | 12/2020 | Bourget | G06F 21/554 |
| 2005/0021644 A1 | 1/2005 | Hancock | |
| 2005/0039017 A1 | 2/2005 | Delany | |
| 2005/0039019 A1 | 2/2005 | Delany | |
| 2005/0114367 A1 | 5/2005 | Serebrennikov | |
| 2005/0228996 A1* | 10/2005 | Mayer | H04N 1/32016 713/170 |
| 2006/0004896 A1* | 1/2006 | Nelson | H04L 51/12 |
| 2006/0031315 A1 | 2/2006 | Fenton et al. | |
| 2006/0031359 A1* | 2/2006 | Clegg | H04L 51/12 709/206 |
| 2006/0179113 A1 | 8/2006 | Buckingham et al. | |
| 2007/0067465 A1 | 3/2007 | Blinn et al. | |
| 2007/0078936 A1 | 4/2007 | Quinlan et al. | |
| 2007/0079379 A1 | 4/2007 | Sprosts et al. | |
| 2007/0244974 A1 | 10/2007 | Chasin | |
| 2008/0034212 A1* | 2/2008 | Altieri | H04L 63/0442 713/176 |
| 2008/0052758 A1 | 2/2008 | Byrnes | |
| 2008/0172468 A1 | 7/2008 | Almeida | |
| 2008/0189770 A1 | 8/2008 | Sachtjen | |
| 2008/0201487 A1 | 8/2008 | Blinn et al. | |
| 2008/0276318 A1 | 11/2008 | Leung et al. | |
| 2008/0282344 A1 | 11/2008 | Shuster | |
| 2008/0307085 A1 | 12/2008 | Curran et al. | |
| 2009/0043855 A1 | 2/2009 | Bookstaff et al. | |
| 2009/0100185 A1 | 4/2009 | Sheha et al. | |
| 2009/0157889 A1 | 6/2009 | Treuhaft | |
| 2010/0005146 A1 | 1/2010 | Drako et al. | |
| 2010/0005191 A1 | 1/2010 | Drako et al. | |
| 2010/0011420 A1 | 1/2010 | Drako et al. | |
| 2010/0023611 A1 | 1/2010 | Yang et al. | |
| 2010/0070569 A1 | 3/2010 | Turakhia | |
| 2010/0299399 A1 | 11/2010 | Wanser et al. | |
| 2010/0325240 A1 | 12/2010 | Drako et al. | |
| 2011/0022670 A1 | 1/2011 | Drako et al. | |
| 2011/0271349 A1 | 11/2011 | Kaplan | |
| 2011/0282997 A1* | 11/2011 | Prince | H04L 63/1433 709/226 |
| 2011/0289581 A1 | 11/2011 | Gourevitch et al. | |
| 2012/0017259 A1* | 1/2012 | MacCarthaigh | H04L 29/12066 726/1 |
| 2012/0059895 A1 | 3/2012 | Gardner et al. | |
| 2012/0124369 A1 | 5/2012 | Amenedo et al. | |
| 2012/0215892 A1 | 8/2012 | Wanser et al. | |
| 2012/0278467 A1 | 11/2012 | Schneider | |
| 2012/0278889 A1* | 11/2012 | El-Moussa | H04L 63/1425 726/23 |
| 2013/0007177 A1 | 1/2013 | Gardner et al. | |
| 2013/0346743 A1 | 12/2013 | Dixon et al. | |
| 2014/0019558 A1 | 1/2014 | Pollack | |
| 2014/0215571 A1* | 7/2014 | Shuster | H04L 63/1483 726/4 |
| 2014/0344232 A1 | 11/2014 | Kludy | |
| 2014/0372363 A1 | 12/2014 | Chestnut et al. | |
| 2014/0373097 A1 | 12/2014 | Thayer et al. | |
| 2014/0373106 A1 | 12/2014 | Morgenroth | |
| 2015/0195299 A1* | 7/2015 | Zoldi | H04L 63/1408 726/25 |
| 2015/0281168 A1 | 10/2015 | Holloway et al. | |
| 2017/0063798 A1 | 3/2017 | Lapidous | |
| 2017/0093772 A1 | 3/2017 | Gupta | |
| 2017/0339174 A1* | 11/2017 | Mounaguruswamy | H04L 63/145 |
| 2018/0034766 A1 | 2/2018 | Chiba et al. | |
| 2018/0227259 A1 | 8/2018 | Gupta | |
| 2018/0262462 A1* | 9/2018 | Blinn | H04L 61/1511 |
| 2019/0222608 A1 | 7/2019 | Naccarato et al. | |
| 2020/0137021 A1 | 4/2020 | Janakiraman | |
| 2021/0084071 A1* | 3/2021 | Mandrychenko | G06N 20/00 |

FOREIGN PATENT DOCUMENTS

| | | |
|---|---|---|
| CN | 101390087 A | 3/2009 |
| CN | 102474700 A | 5/2012 |
| CN | 102664817 A | 9/2012 |

OTHER PUBLICATIONS

Z. Wang and R. Wang, "Self-verified DNS reverse resolution," 2013 Proceedings of ITU Kaleidoscope: Building Sustainable Communities, 2013, pp. 1-8. (Year: 2013).*

Lihua Yuan, Chao-Chih Chen, Prasant Mohapatra, Chen-Nee Chuah, and Krishna Kant. 2013. A Proxy View of Quality of Domain Name Service, Poisoning Attacks and Survival Strategies. ACM Trans. Internet Technol. 12, 3, Article 9 (May 2013), 26 pages. (Year: 2013).*

Barbosa, K. R. S., et al., "Identifying and Classifying Suspicious Network Behavior Using Passive DNS Analysis," IEEE International Conference on Computer and Information Technology; Ubiquitous Computing and Communications; Dependable, Autonomic and Secure Computing; Pervasive Intelligence and Computing, Oct. 26-28, 2015, DD. 160-167, Liverpool, UK.

Bassil, R. et al., "Security Analysis and Solution for Thwarting Cache Poisoning Attacks in the Domain Name System," IEEE, 19th International Conference on Telecommunications, 2012, six pages.

China National Intellectual Property Administration, Notification for Going through Patent Registration Formalities, CN Patent Application No. 201680021979.8, dated Apr. 7, 2021, eight pages.

China National Intellectual Property Administration, Notification of the First Office Action, CN Patent Application No. 201680021979.8, dated Apr. 7, 2020, 31 pages.

Dagon, D., et al., "Increased DNS Forgery Resistance Through 0×20-Bit Encoding," Proceedings of the 15th ACM conference on

(56) References Cited

OTHER PUBLICATIONS

Computer and communications security, Oct. 27-31, 2008, pp. 211-222, Alexandria, Virginia, USA.

Durumeric, Z. et al., "Neither Snow Nor Rain Nor MITM . . . An Empirical Analysis of Email Delivery Security," Proceedings of the 2015 Internet Measurement Conference, Oct. 2015, pp. 27-39.

Esquivel, H. et al., "On the effectiveness of IP reputation for spam filtering." Communication Systems and Networks (COMSNETS), 2010 Second International Conference on. IEEE, 2010, pp. 1-10.

European Patent Office, Extended European Search Report and Opinion, European Patent Application 16749596.9, dated Sep. 7, 2018, nine pages.

European Patent Office, First Examination Report, European Patent Application 16749596.9, dated Feb. 3, 2020, five pages.

Foster, I. D., et al. "Security by any other name: On the effectiveness of provider based email security." Proceedings of the 22nd ACM SIGSAC Conference on Computer and Communications Security. ACM, 2015, pp. 450-464.

Gojmerac, I. et al. "Large-Scale Active Measurements of DNS Entries Related to E-Mail System Security." IEEE ICC 2015—Communication and Information Systems Security Symposium, Jun. 8-12, 2015, pp. 7426-7432.

Kitterman, S., "Sender Policy Framework (SPF) for Authorizing Use of Domains in Email, Version I," Internet Engineering Task force (IETF). Apr. 2014 (Apr. 2014), 64 Pages, Can be Retrieved from the internet <URL:http://www.rfc-editor.org/in-notes/pdfrfc/rfc7208.txt.pdf>.

PCT International Search Report and Written Opinion for PCT/US2016/015796, dated Apr. 8, 2016, 20 pages.

Sanchez, F., et al., "A Sender-Centric Approach to Detecting Phishing Emails," 2012 International Conference on Cyber Security, IEEE, Dec. 14-16, 2012, pp. 32-39, Washington, DC, USA.

Shiftweb Solutions, "Improve Email Deliverability for Google Apps with SPF and DKIM," Google, Productivity, Tips, Uncategorized, Sep. 16, 2013, II pages, [Online] [Retrieved on Aug. 30, 2018], Retrieved from the Internet <URL:htms://shiftwebsolutions.com/improve-email-deliverability-for-google-apps-with-spf-and-dkim/>.

Wang, Z. et al. "Self-Verified DNS Reverse Resolution." 2013 Proceedings of ITU Kaleidoscope Academic Conference: Building Communities, 2013, pp. 1-8.

Wong, M. et al., "Sender Policy Framework (SPF) for Authorizing Use of Domains in E-mail," The Internet Society (2006), Network Working Group Request for Comments: 4408, Category: Experimental, Apr. 2006, 48 pages, No. 1.

Xue-Song, L., "Research on E-mail Authentication Technologies," Communications Technology, Nov. 30, 2008, one page (with English abstract).

European Patent Office, Extended European Search Report, European Patent Application No. 21209947.7, dated Feb. 28, 2022, 11 pages.

United States Office Action, U.S. Appl. No. 17/500,306, dated Mar. 8, 2022, 25 pages.

\* cited by examiner

AUTHENTICATION OF EMAIL SENDERS VIA AUTHORIZING DNS SERVER

CROSS REFERENCE TO RELATED APPLICATIONS

This application is a continuation of U.S. application Ser. No. 17/360,322 filed on Jun. 28, 2021, which is a continuation of U.S. application Ser. No. 17/128,008 (now U.S. Pat. No. 11,057,437), filed on Dec. 19, 2020, which is a continuation application of U.S. application Ser. No. 16/296,121, (now U.S. Pat. No. 10,897,485) filed on Mar. 7, 2019, which is continuation of U.S. application Ser. No. 15/663,771 (now U.S. Pat. No. 10,257,231), filed on Jul. 30, 2017, which is a continuation U.S. application Ser. No. 15/175,031 (now U.S. Pat. No. 9,762,618), filed on Jun. 6, 2016, which is a continuation of International Application No. PCT/US2016/015796, filed on Jan. 29, 2016, which claims the benefit of U.S. Provisional Application No. 62/116,409, filed on Feb. 14, 2015, all of which are hereby incorporated by reference in their entirety for all purposes.

BACKGROUND

Field of Art

The disclosure generally relates to the field of electronic messaging, and specifically to centralized validation of email senders via EHLO name and IP address targeting.

Description of Art

In distributed messaging systems like email, the actual originator of a message may be validated against the message's purported identity in order to eliminate fraudulent messages. Examples of such fraudulent messages may include "phishing" emails that purport to be from a particular sender but in fact have a spoofed sender address and are sent from a malicious entity that may wish to perform some fraudulent activity against the recipient (e.g., steal personal information). One approach to this validation problem is to enable the owner of the sending identity to create a set of rules defining which computers are allowed to relay emails to the recipient's email server. Sender Policy Framework (SPF) is the standard implementation of this approach for email. A sending identity publishes these SPF rules via the Domain Name System (DNS) such that a receiving mail server may be able to access them in order to validate the sender's identity of received messages.

While this approach can be effective, it places substantial burdens on the receiving system and introduces challenges with the use of valid intermediaries (e.g. mailing lists, 'lifetime' email accounts). For example, a mailing list server may be asked to forward a message from an original sender, however, the mailing list server is not identified by the original sender as a valid sender. It is simply not feasible for receiving systems to check more than a few such rules when validating a message, even though a complete rule set might require hundreds or even thousands of rules.

SPF also includes tight limits on the number of Domain Name System (DNS) lookups that are allowed, in order to limit the burden on receiving systems, but this comes at the cost of failing to validate some legitimate messages. Other techniques, like Sender Rewriting Scheme (SRS), replace the original sender with an intermediate identity that can be validated with a more restricted rule set. While this minimizes the burden on the receiving system, it does not validate the message against the originator's identify.

Hence, what is lacking is an ability to allow the definition of arbitrarily large and complex rule sets for sender identity verification, without unduly burdening receiving systems, and which is compatible and interoperable with existing frameworks.

SUMMARY

In some embodiments, systems and methods may comprise reframing the authentication questions around email from the network or IP level to the sending organization level, utilizing the ability of the existing Sender Policy Framework (SPF) protocol to encode network information available from the SMTP connection into a targeted domain name, and combining that with a custom DNS system backed by a database that maps that network information to a list of known organizations.

In some embodiments, systems and methods allow domain managers to define a set of organizations that are able to send email on their behalf without any additional work, such as manual lookup of SPF records for authorized organizations, modification of DNS TXT records for the domain, etc. It also allows domain manager to authorize any number of sending organizations, and frees the domain manager of the need to track changes to the SPF configuration for authorized senders.

In some embodiments, systems and methods may comprise a Sender Policy Framework (SPF) which may be the protocol by which the owners of a domain can define a set of rules (known as directives) in a DNS TXT record designating which mail servers can deliver emails originating from that domain. Receiving mail servers evaluate those rules and, based on the IP address of the delivering server, determine whether the message in question is allowed to originate from that domain.

In some embodiments, systems and methods may utilize two features of SPF. First, the 'include' mechanism, by which an SPF record can reference a target domain where an additional DNS SPF record is defined, and include the rules defined in this reference record into the evaluated rule set. Second, the macro system by which request-specific values such as the IP address and EHLO name associated with the SMTP connection can be interpolated into the target domain.

In some embodiments, when configuring a domain, an SPF record may be constructed for the domain that incorporates an 'include' directive that uses SPF macros to encode the name of the domain for which an email is being authorized, as well as the EHLO name and/or IP address of the SMTP connection into a target domain name. The target domain name may be constructed so as to be in a DNS zone managed by the targeted SPF DNS resolver—the DNS system responsible for mapping network information to a list of known organizations.

In further embodiments, the targeted SPF DNS resolver may be responsible for responding to DNS queries to target domains. It may also be responsible for maintaining an accurate and up-to-date mapping of network information to known organizations, which may involve combining public information such as domain registration records, public DNS entries, and curated information.

In further embodiments, systems and methods for enhancing sender policy framework (SPF) may advance the art of authenticating email, by reducing the overall complexity and maintenance burden exposed to a domain manager and removing existing limitations of the state of the art systems for providing similar authentication. In addition, the methods may not require any changes to the systems receiving email, and may be compatible with the existing and extensive base of installed software.

BRIEF DESCRIPTION OF THE DRAWINGS

The disclosed embodiments have advantages and features which will be more readily apparent from the detailed description, the appended claims, and the accompanying figures (or drawings). A brief introduction of the figures is below.

DETAILED DESCRIPTION

Figure 1:
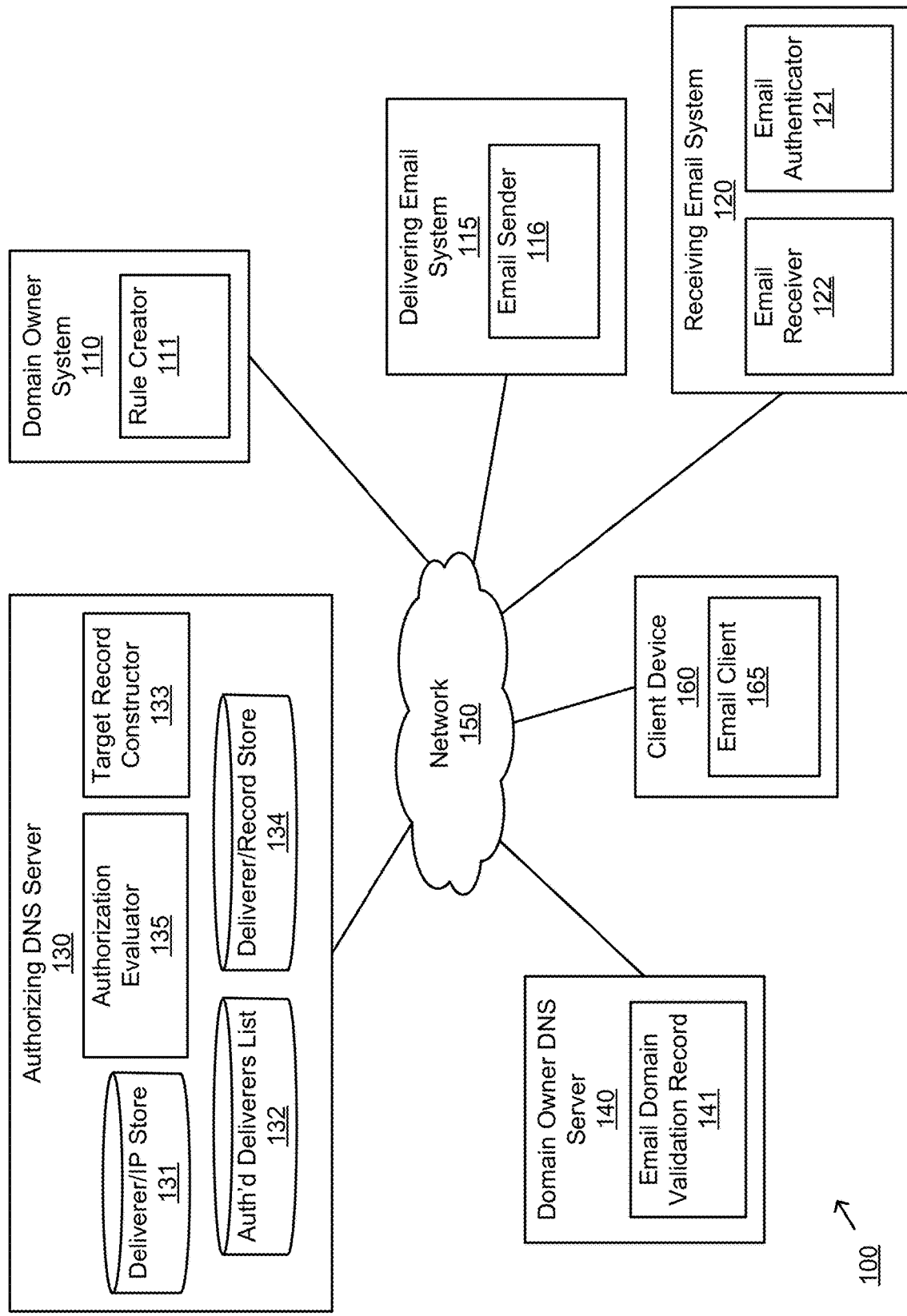
FIG. 1 illustrates an example system capable of validating email senders through intermediaries via EHLO name and IP address targeting according to an embodiment.

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

Disclosed by way of example embodiments is a system and process capable of validating email senders through intermediaries via EHLO name and IP address targeting. In an embodiment, a DNS server receives from a receiving email system, a DNS query for an email domain stored at the DNS server, the DNS query including identifying information of a sender of an email, and the email identifying itself as being from the email domain. The DNS server extracts the identifying information of the email sender from the DNS query, and identifies one of a plurality of delivering organizations from the identifying information. The DNS server determines whether the identified delivering organization is authorized to deliver email on behalf of the email domain. In response to determining that the identified delivering organization is authorized to deliver email on behalf of the email domain, the DNS server generates a target validation record based on the identity of the authorized delivering organization and the email domain, the target validation record including one or more rules indicating to the receiving email system that the delivering organization is an authorized sender of email for the email domain, and sends the target validation record to the receiving email system in response to the DNS query.

In one embodiment, a sending email system is configured to create an email domain validation record to include in a DNS record of an email domain, the email domain validation record to be parsed by a receiving email system when receiving an email from the target domain, and indicating to the receiving email system whether the sender of an email is an authorized sender for the email domain. To create the email domain validation record, the sending email system composes the email domain validation record to include a target domain, the target domain being a domain distinct from the email domain, causing the receiving email system, when parsing the email domain validation record, to submit a second request for a validation record to the target domain. The sending email system also composes the email domain validation record to include one or more macro statements specifying identifying information, the macro statements causing the receiving email system, when parsing the email domain validation record, to include identifying information of the sender of the email in the second request. The sending email system is configured to publish this created email domain validation record as a DNS record of the email domain.

Introduction

Sender Policy Framework (SPF) is a powerful tool for authenticating email, but as used today it has some substantial limitations that make it difficult to configure, and impose significant limitations on the number of services that can, in practice, be authenticated to deliver email for a given email domain. In some embodiments, systems and methods may provide a method by which email domain owners can support a) configuration of SPF authentication of their email domains in terms of services, not networking primitives and b) configuration of an unlimited number of these services.

Example Key Delegation System

FIG. 1 illustrates an example system 100 capable of validating email senders through intermediaries via EHLO name and IP address targeting according to an embodiment. The system 100 includes a network 150, one or more client devices 160, authorizing DNS server 130, domain owner DNS server 140, a domain owner system 110, a delivering email system 115, and a receiving email system 120. Although the illustrated system 100 includes the elements shown in FIG. 1, in other embodiments the system 100 may include different elements. Furthermore, the functionalities of each element may be distributed differently among the elements in other embodiments.

The network 150, which can be wired, wireless, or a combination thereof, enables communications among the client devices 160, the DNS systems 130/140, domain owner system 110, and third party system 120, and may include the Internet, a LAN, VLAN (e.g., with VPN), WAN, or other network. In one embodiment, the network 150 uses standard communications technologies and/or protocols, such as Hypertext transfer Protocol (HTTP), Transmission Control Protocol/Internet Protocol (TCP/IP), Uniform Resource Locators (URLs), and the Doman Name System (DNS). In another embodiment, the entities can use custom and/or dedicated data communications technologies instead of, or in addition to, the ones described above.

The domain owner system 110 includes one more computing systems of a particular domain (e.g., examplecorp.com), which may be configured similarly to the computing system described with reference to FIG. 4.

In one embodiment, the domain owner system 110 includes a rule creator 111 that generates validation rules to allow receiving email systems, such as receiving email system 120, to verify the authenticity of emails that indicate the domain of the domain owner system 110 as the sender of the email. When a receiving email system 120 receives such an email, it may check these validation rules to see if the email was in fact legitimately sent from the domain owner system 110. In one embodiment, the rule indicates an Internet Protocol (IP) address of the domain owner system 110, such that the receiving email system 120 verifies whether the email was received from the IP address indicated in the rule.

These rules may be automatically generated based on the detected network characteristics (e.g., detected IP address of the sending email system, domain name information) or may be received by the rule creator 111 from an administrator through a user interface. Once the rules are generated, the rule creator 111 publishes the rules in a publicly accessible location. This publicly accessible location is a trusted location where only the domain owner for the domain of the domain owner system 110 can publish. Any receiving email system 120 may then access this public location to retrieve the rules. In one embodiment, the public location is the Domain Name System (DNS). Thus, these rules may be stored in an email domain verification record 141 on domain owner DNS server 140. In one embodiment, the rules are Sender Policy Framework (SPF) rules (which are documented in RFC 4408 and 7208 and incorporated by reference herein).

The delivering email system 115 sends email on behalf of the domain owner system 110. The delivering email system 115 comprises one or more computing systems, which may be configured similarly to the computing system described with reference to FIG. 4. As an example, the delivering email system 115 may be a mailing list server, a bulk mailer provider that sends emails on behalf of a domain, a transactional email system managed by a third party that sends emails on behalf of a domain, or a security system that scans emails on behalf of a domain. The delivering email system 115 may send the email instead of the domain owner system 110 so that the delivering email system 115 may provide additional processing or functionality to the email.

The delivering email system 115 includes an email sender 116 to send emails. In one embodiment, the email sender 116 uses standard mail protocols, such as Simple Mail Transfer Protocol (SMTP). SMTP supports various features. In particular, when a sending email system communicates with a receiving email system, SMTP indicates that the sending email system may send a HELO or extended HELO (EHLO) message to the receiving email system. This HELO/EHLO message includes an identifier of the sending email system (e.g., a domain name), and in the case of an EHLO message, may include additional identifiers indicating the supported extensions and features of the sending email system.

When forwarding or otherwise transferring messages or emails that were originally sent by the domain owner system 110, the validation rules associated with the domain owner system 110 and which may be stored as an email domain validation record 141 are modified such that they may accommodate the authentication of the delivering email system 115.

The receiving email system 120 is an email system that receives one or more emails from the delivering email system 115. The receiving email system 120 comprises one or more computing systems, which may be configured similarly to the computing system described with reference to FIG. 4.

The receiving email system 120 includes an email receiver 122 to receive emails. In one embodiment, the email receiver 122 uses standard mail protocols, such as Simple Mail Transfer Protocol (SMTP).

The receiving email system 120 comprises an email authenticator 121 to validate the identity of the sender of any received emails to ensure that the email is not fraudulent. Upon receiving an email, the email authenticator 121 may look up any associated email domain validation record associated with either the identification provided by the server from which the email was received (e.g., via a HELO command), or the domain indicated in the Return-Path address of the email (e.g., "gmail.com"), or via some other identifier. The email authenticator 121 determines whether the information identified from the email, such as the sender's IP address, matches or is allowed by any of the rules indicated in any one of the associated email domain validation records. If a match is found in the rules, then the email authenticator 121 determines that the email message is likely to be valid and is from the purported sender and not from a fraudulent source.

In one embodiment, the rules indicated in the email domain validation records are SPF rules. An SPF rule may indicate an IP addresses, such that the email authenticator 121 may verify whether the IP address indicated in the SPF rule matches the IP address or other identifying information of the server that sent the email to the receiving email system 120. An SPF rule may also indicate another domain, in which case the email authenticator 121 may look up the SPF rule record for that other domain to see if any rules in that record match the identifying information of the server that sent the email. Additionally, in some cases, SPF rules support macros, which are special placeholder indicators that the email authenticator 121 substitutes with data that is determined dynamically at the time of receipt of the email. For example, the email authenticator 121 may expand a macro such as "%{d}" which is indicated in the rule to the Return-Path domain of the email (e.g., "acme.com"). Additional macro commands are described in further detail in the SPF RFCs 7208 and 4408.

The DNS servers 130 and 140 store DNS records for use in a DNS system. Each DNS server may comprise one or more computing systems such as the computing system described with reference to FIG. 4.

Each DNS server may store multiple DNS records for a particular domain, such an A record, MX record, and so on, as known in the art. Although the records as illustrated in FIG. 1 are separated into multiple entries and are on multiple servers, in other embodiments the records are combined into fewer entries, a single server, a single entry, or some other combination. Furthermore, although a certain number of records for each domain are illustrated in FIG. 1, in other embodiments each domain may have multiple records.

As illustrated in FIG. 1, domain owner DNS server 140 includes an email domain validation record 141. This email domain validation record 141 may include one or more rules that allow a receiving email system 120 to validate the authenticity of an email that it has received. As described above, the email domain validation record 141 may indicate an IP address or other identifier for the sender associated with a domain, such that the receiving email system 120 may be able to verify that the IP address (or other identifier) of the sender of the email corresponds to the domain indicated in the email (e.g., an email from "acmebank.com" is actually from Acme Bank). However, such a simple rule may be disadvantageous in the case where a third party delivering email system 115 is used to send mail on behalf of a sending email system or domain owner. This is because the rule in the email domain validation record 141 may not indicate that the delivering email system 115 is a valid sender for a particular domain.

Instead, the email domain validation record 141 may include a rule with a separate domain. The DNS records for this separate domain may exist elsewhere, such as on authorizing DNS server 130. Furthermore, this rule with the separate domain also includes one or more macros, that when parsed by the receiving email system 120, cause the receiving email system 120 to substitute the macros with additional information identifying the server from which the receiving email system 120 received the email, or other identifying information regarding the email. In one embodiment, this information includes any identifiers in an EHLO message from the server from which the receiving email system 120 received the email, as well as the IP address of the same server. Once the rule is parsed, the receiving email system 120 is caused by the rule to query the DNS records of the separate domain indicated in the rule. For example, the rule may indicate a domain with macro of "%{i}._ip.verifier.com". After expansion, the macro "%{i}" may be replaced by the IP address of the server that sent the email to the receiving email system 120 (e.g., this could be the delivering email system 115), and the receiving email system 120 queries for the DNS records of the domain "verifier.com," and passes the IP address to the DNS server that may provide the DNS record in question.

The DNS records for this separate domain may reside at (or may be queried at) authorizing DNS server 130. The authorizing DNS server 130 includes a deliverer/IP store 131 that stores information regarding delivering email systems and their associated IP addresses and EHLO information. The authorizing DNS server 130 also includes a deliverer/record store that stores rules authenticating various delivering email systems. The authorizing DNS server 130 also includes an authorized deliverers list 132 that indicates the authorized delivering email systems for various domains.

The domain information, with the macros replaced by the identifying information of the server that sent the email as described above, is received by the authorizing DNS server 130 from the receiving email system 120 in a DNS query. The authorizing DNS server 130 includes an authorization evaluator 135 that determines whether the server indicated in the identifying information is authorized to send emails on behalf of the domain that is indicated in the identifying information. In one embodiment, the domain is indicated from the EHLO information that is passed to the authorizing DNS server 130 (via the use of the macro), and the identifying information for the server is passed via an IP address. The authorization evaluator 135 accesses the deliverer/IP store 131 to determine the identity of the delivering email system 115 associated with the identifying information. If such information is found, the authorization evaluator accesses the authorized deliverers list 132 to determine whether that delivering email system is an authorized delivery agent for the domain indicated in the identifying information of the DNS query.

If so, the authorizing DNS server 130 includes a target record constructor 133 that constructs a set of rules using the deliverer/record store 134 as a response (to transmit) to the receiving email system 130. This set of constructed rules indicates that the delivering email system (e.g., the delivering email system 115) that sent the email is a valid sender for the domain indicated in the email. The receiving email system 120 may then use the information in the response to verify that the delivering email system is a valid sender, and allow this email to be received by its intended recipient. Otherwise, if the delivering email system was indicated not to be valid according to the response, then the receiving email system 120 may instead discard the email or flag it.

The client device 160 may be used to view emails that are received an authenticated by the receiving email system 120. The client device 160 may comprise a computing system such as the computing system described with reference to FIG. 4.

Specifically, the client device 160 includes an email client 165 to interface with the receiving email system 120. The email client 165 may use standard email protocols, such as Post Office Protocol 3 (POP3), Internet Message Access Protocol (IMAP), Messaging Application Programming Interface (MAPI), SMTP, and so on, in order to communicate with the receiving email system 120. In one embodiment, if an email is not properly authenticated by the receiving email system 120, the email client 165 does not receive the email. In other embodiments, the email client 165 may receive the email but also receive an indication that the email is suspected to be fraudulent or suspicious.

Using the system 100 described above, a domain owner is able to utilize the services of other third party delivering organizations and their delivering email systems in order to send emails and still have these emails be validated by receiving email systems 120 as being authentic. Instead of updating a variety of email domain validation records, a DNS server may, in a centralized location, construct a simple set of rules depending on the identifying information received from a receiving email system 120 for the delivering email system 115 which sent the email. Furthermore, the receiving email system 120 does not need to query a large number of DNS records that may be present in rules in an email domain validation record. This increases performance and simplifies the management of sending emails via third party agents, while still providing security and preventing fraudulent or suspicious messages from being received. Additional details regarding the systems and processes described above are described with reference to FIGS. 2-3.

Example Interaction Diagram for Email Domain Validation Record Creation

Figure 2:
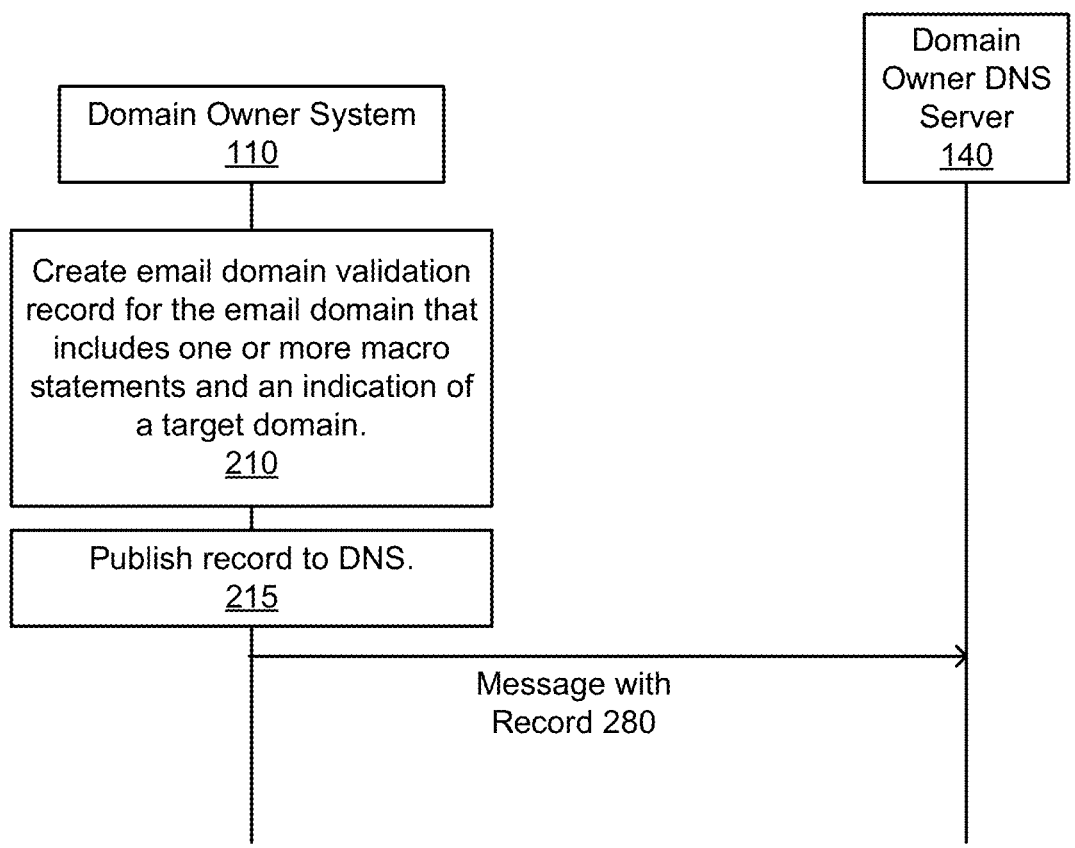
FIG. 2 is an interaction diagram and flow chart illustrating an exemplary process for creation of an email domain validation record for use with a third party delivering organization according to one embodiment.

FIG. 2 is an interaction diagram and flow chart illustrating an exemplary process for creation of an email domain validation record for use with a third party delivering organization according to one embodiment. In one embodiment, FIG. 2 attributes the operations in process to the indicated elements. However, some or all of the steps may be performed by other elements. In addition, some embodiments may perform the operations in parallel, perform the operations in different orders, or perform different operations. Also, it is noted that in one example embodiment the steps and/or modules may be embodied as instructions, e.g., instructions 424, that may be executed by the processor 402 described with respect to FIG. 4.

For the purposes of this discussion, an email domain shall refer to any domain that a receiving email system 120 may use as the 'domain' when evaluating SPF for an inbound email message. Typically, this will be the domain found in the Return-Path for the message.

The domain owner system 110, which is the email domain owner, or a designated party, may configure the DNS record for the email domain. This may involve creating (or generating) 210 an email domain validation record 141 (which may be an SPF record) for use with the email domain. The record indicates that a particular sender is a valid sender for an email from the email domain. In one embodiment, the record is an SPF record and is constructed so that it may incorporate a specific "include" directive. The include directive may indicate a targeted SPF domain specification, which indicates another domain, such that some or all of the SPF authentication decision for a message is deferred to the SPF record found at the other domain. In other words, as described above, the record includes a separate domain which is separately queried to determine the final SPF authentication information.

In one embodiment, the targeted SPF domain specification in the email domain validation record 141 may be configured to dynamically change behavior for an email message based on the SMTP connection attributes for that message. This change may be accomplished by causing the receiving server to use the SMTP connection attributes and email domain to build a custom domain name which, when resolved, yields a targeted SPF record that applies to the message being processed.

To accomplish this, in one embodiment, the targeted SPF domain specification may comprise three properties. First, it may be constructed such that the eventual authority for any domain name resolved from the targeted SPF domain specification is a targeted DNS SPF resolver (e.g., authorizing DNS server 130).

This may be accomplished by ensuring that the targeted domain specification eventually resolves to a subdomain of one or more particular fixed domains. In some implementations the DNS record containing the targeted SPF domain specification may be hidden behind one or more DNS CNAME or NS records referring to other domains, and not managed by the targeted DNS SPF resolver. This allows for redirection or masking of the eventual DNS query target. In other words, the other domains may need to be queried by a receiving email system before the final DNS query target is determined.

Second, the targeted SPF domain specification may cause a receiving email system 120 to capture the EHLO name and/or the IP address for the SMTP connection. These values may be captured using the SPF macro system. The %{h} macro can be used to capture the EHLO name, and the %{i} or %{p} macros can be used to the capture the IP address or the validated domain name of the IP address. In some embodiments, the domain owner system 110 may configure the targeted SPF domain specification to also cause the receiving email system 120 to capture the local part of the sender address or the complete sender address with either the %{l} and/or %{s} macros, and encode the resulting values into the targeted SPF domain specification.

Depending on the exact configuration of the system, one or more of the optional transformers described in the SPF macro language may be applied in the targeted SPF domain specification. Similarly, the uppercase variants %{H}, %{I}, %{P}, %{L}, or %{S} may be used instead, so that the result is URL encoded.

Third, the targeted SPF domain specification may be constructed in such a way that the SMTP connection attributes can be parsed unambiguously from the resulting domain, which can actually be accomplished for real world systems.

To demonstrate this, a format for the targeted SPF domain specification that meets these three requirements may be constructed. For example, assume that the targeted DNS SPF resolver (e.g. authorizing DNS server 130) responds to all DNS TXT queries in the zone defined by the domain 'resolver.com'. Also assume that the email domain is 'emaildomain.com'. Finally, assume that both the EHLO name and the IP address are captured.

In this case the Letters-Digits-Hyphen (LDH) rules for hostnames may be used. These rules include the restriction that fully qualified domain names (FQDN) can only contain ASCII letters, numbers, or the hyphen character. More generally domains, including those used in SPF record lookups, do not need to meet this restriction. As both the EHLO name and the email domain are required to be FQDNs, these fields may be separated by the domain owner system 110 when creating the targeted SPF domain specification with labels that contain non-LDH characters such as '_'. Since an IP address can only consist of digits (IPv4) or digits and the letters a-f (IPv6), the labels comprising the IP address cannot contain '_' either. Thus, labels containing '_' may be used as separators for these values as well.

Combining all of the above, one targeted SPF domain specification that meets the requirements within the context of the example is: '{i}._ipaddr.%{h}._ehlo.emaildomain.com._tspf.resolver.com'. Any domain name interpolated during the SPF process from this domain spec will be rooted in 'resolver.com' (the rightmost domain indicated). It includes both the EHLO name and IP address in the domain name. Furthermore, the use of labels containing '_' supports non-ambiguous parsing of the SMTP attributes from such a domain name.

Note that there are a large number of potential formats that meet these requirements, and this particular example should be considered non-limiting.

The email domain validation record 141 should then have an SPF rule that has an include directive that refers to a targeted SPF domain specification as described above. A simple, non-limiting example of such a record that uses the example targeted SPF domain specification described above would be 'v=spf1 include:%{i}._ipaddr.%{h}._ehlo.emaildomain.com._tspf.resolver.com'. Again, while this record is realistic for our example, it should be considered non-limiting. Note that "v" refers to the SPF version, and the include directive indicates that the domain indicated is a valid sender for the email domain.

Once the email domain validation record 141 is constructed, it may be published 215 as a DNS TXT record for the email domain (e.g., at domain owner DNS server 140). This will allow it to be queried by any server that receives email that indicates this domain.

Example Interaction Diagram for Email Verification Rule Resolution

Figure 3:
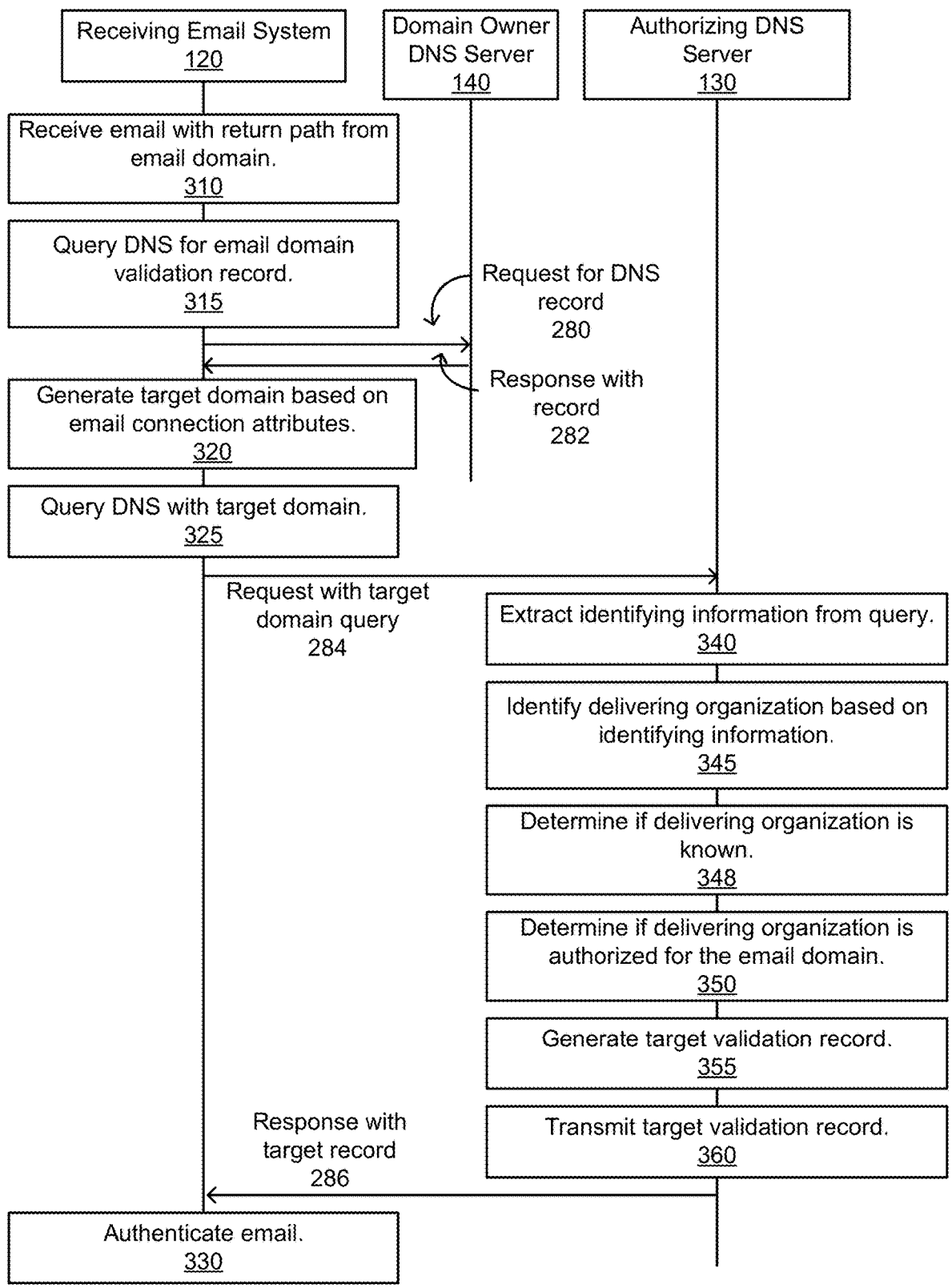
FIG. 3 is an interaction diagram and flow chart illustrating an exemplary process for resolution of an email domain validation record using DNS according to one embodiment.

FIG. 3 is an interaction diagram and flow chart illustrating an exemplary process for resolution of an email domain validation record using DNS according to one embodiment. In one embodiment, FIG. 3 attributes the operations in process to the indicated elements. However, some or all of the steps may be performed by other elements. In addition, some embodiments may perform the operations in parallel, perform the operations in different orders, or perform different operations. Also, it is noted that in one example embodiment the steps and/or modules may be embodied as instructions, e.g., instructions 424, that may be executed by the processor 402 described with respect to FIG. 4. Note that the processes described here do not necessarily require any additional modification or configuration of the receiving email system 120. Instead, so long as the receiving email system 120 supports SPF or a similar sender authentication scheme, it does not need to be modified.

Initially, the receiving email system 120 receives 310 an email with a return path corresponding to a particular email domain. The receiving email system 120 may attempt to authenticate this email message (e.g., using SPF). The receiving email system 120 may first query 315 DNS for any email validation records for the email domain. These may be SPF records. The domain owner DNS server 140 may return the email domain validation record 141 in a response 282 that the owner of the email domain has published as described with reference to FIG. 2.

The receiving email system 120 parses the email validation record, and generates 320 a target domain query. This process may include evaluating the include directive with the target domain SPF specification in the returned DNS record using values for the current SMTP connection (e.g., EHLO, IP address), and interpolating these values into the target domain SPF specification to construct the target domain. For example, if the record indicates a rule of '%{i}._ipaddr.%{h}._ehlo.emaildomain.com._tspf.resolver.com', the receiving email system 120 may evaluate this into '"123.123.123.123._ipaddr.deliveringdomain.com._ehlo.e-maildomain.com._tspf.resolver.com' assuming that 123.123.123.123 is the IP address of the sender, emaildomain.com is the domain of the original sender, and deliveringdomain.com is the domain name indicated in the EHLO message for the sender.

The receiving email system 120 then queries 325 the DNS with the target domain. This query may be responded to by the authorizing DNS server 130 (which may be an authoritative server for the target domain). The authorizing DNS server 130 extracts 340 the identifying information from the query. This identifying information may include the EHLO name and IP address, and may be parsed from the target domain query. In one embodiment, the authorizing DNS server 130 may also parse the local part of the Return-Path address from target domain of the query, either as a stand-alone value or as part of an encoded complete sender address.

In one embodiment, the authorizing DNS server 130 also extracts the email domain from the target domain query (if it has been included in the query via a macro). If the email domain is present and, if the authorizing DNS server 130 is configured to only process requests for a limited set of domains, then the domain owner DNS server 130 can determine if the email domain is known. In this case the authorizing DNS server 130 may return a default SPF record if the email domain is not known. The returned record is likely to be a record that does not pass any IP address—an example would be "v=spf1~all".

The authorizing DNS server 130 uses the identifying information that is extracted from the query to identify 345 the delivering organization. The delivering organization is the owner of the delivering email system 115, which may not be part of the email domain. The authorizing DNS server 130 includes a deliverer/IP store 131 that associates the identifying information extracted from the query with delivering organizations such that network specific information associated with an email message's SMTP connection (e.g., EHLO name and/or sending server IP address) may be associated with the higher-level abstraction of a delivering organization.

Some examples of common delivering organizations are third party senders contracted to send email by the email domain owner, a mailing list that is relaying a message originating from the email domain to a number of receiving addresses, or a forwarding system that is designed to alias one receiver address to another. This set of examples should not be considered exhaustive, and the list should be considered non-limiting.

In one embodiment, access to the header information of a substantial (i.e., statistically significant) corpus of email (100s of millions of messages or more) may allow the authorizing DNS server 130 or other entity to construct the deliverer/IP store 131 by use of information found in the email headers (specifically the 'Received' and 'Authentication-Results' headers). In other embodiments, one could survey a list of delivering organizations, and combine the results into a suitable deliverer/IP store 131. In further embodiments, domain registration records, especially the information stored in the WHOIS database, can be useful for building this mapping for the deliverer/IP store 131. These example methods should be considered non-limiting, and the process described herein does not preclude the use of other methods or the combination of multiple methods for the construction of the deliverer/IP store 131.

In further embodiments, the inbound stream of DNS queries received by the authorizing DNS server 130 can be used as a source of EHLO names and IP addresses that require investigation. For a complete database all (EHLO Name, IP Address) combinations originating from legitimate email should map to a known delivering organization. Any inbound data that cannot be mapped to a known delivering organization may generally indicate a) missing legitimate values in the database or b) a source email that is fraudulent. This 'miss' can thus serve as a source of information to fill in gaps in the database or a source of threat information.

Once the request has been mapped to a delivering organization, in one embodiment the authorizing DNS server 130 may determine 348 if the delivering organization is a known one. If not, then a default record may be returned, such as some variation on an SPF record that fails all IP addresses. For example, 'v=spf1~all', would be a likely choice.

Assuming that the delivering organization is known, then the authorizing DNS server 130 can determine 350 whether the delivering organization is authorized to deliver email for the email domain indicated in the query for the target domain. In one embodiment, the authorizing DNS server 130 allows any identified delivering organization to deliver email for any email domain. In another embodiment, the mapping of email domain to authorized delivering organization could be stored in an authorized deliverers list 132, or made available via a web API, and the authorizing DNS server 130 accesses the list or API to determine whether the delivering organization is authorized.

If the identified delivering organization is not found to be authorized for the email domain, then the authorizing DNS server 130 may return a default record. In general this may be a record denying delivery for all IP addresses (e.g. 'v=spf1~all').

As described above, in one embodiment, the local part of the Return-Path address may have been encoded in the query of the target domain either as a standalone value, or as part of the sender address. In these embodiments, the authorizing DNS server 130 uses the local part of the email address in combination with the email domain to determine whether a delivering organization is authorized to deliver a particular message. For example, a delivering organization may be authorized to send mail on behalf of a "newsletter@acme.com" but not on behalf of a return path address with a local part indicating an email address of an employee at acme.com.

If the delivering organization is authorized to deliver email for the email domain, then the authorizing DNS server 130 generates 355 a target validation record (which may be an SPF record) based on the delivering organization and the email domain. To construct this record, the authorizing DNS server 130 may query a deliverer/record store 134 that includes a map of delivering organizations to target validation records.

For each delivering organization, there may exist some hypothetical email validation record that would allow email from servers used by that delivering organization (e.g., the delivering email system 115), and deny email originating anywhere else. This should be true for any delivering organization that has a properly configured email domain validation record (e.g., an SPF record), as the existing email domain validation record for the delivering organization may be used.

Even if a delivering organization does not have a properly configured email domain validation record, the authorizing DNS server 130 or administrator may be able to build such a record given sufficient knowledge of the underlying network configuration. In one embodiment, the authorizing DNS server 130 creates and stores the email domain validation records for delivering organizations and/or email domains that are not otherwise made available by the delivering organization.

In some embodiments, and for some configurations, the deliverer/record store 134 also associates the email domain and/or the local path as either a replacement or a supplement to the association of the delivering organization with the target validation record. As an example of when such a variation may be desirable, consider a delivering organization that subdivides its cloud of mail servers by email domain. In such circumstances it may be necessary to know the email domain, in combination with the delivering organization, to deliver the optimal target validation record.

In some embodiments, existing email domain validation records may be an important source of information to construct the deliverer/record store 134. For example, in the case of SPF records, the existing records for the delivering organization may be used to get a list of directives. In other embodiments, a manual survey of the delivering organizations can also be a good source of this information. In further embodiments, additional methods may also be feasible, as is the use of combinations of sources. The sources listed here should be considered non-limiting.

When using these or any other methods to construct the deliverer/record store 134, it may be necessary to update the data as the underlying network configuration changes with time. In some embodiments, the authorizing DNS server 130 may use polling mechanisms to update the deliverer/record store 134, while in other embodiments. A non-limiting example of such a polling mechanism would be a software component on the authorizing DNS server 130 that executes DNS queries on a regular (e.g. daily) basis to detect updates to DNS records published by known senders. Those updates could then be incorporated by the authorizing DNS server 130 into the database.

After generating the target validation record, the authorizing DNS server 130 transmits 360 the record back to the receiving mail system 120 as a response to the original query.

The receiving mail system 120 authenticates 330 the email message using the received target validation record.

In one embodiment, instead of instead of using the 'include' mechanism of SPF as described above, the system described here may be configured to use the 'a', 'mx', or 'exists' mechanisms that are part of SPF. If one of these mechanisms is used, the behavior of the email domain owner may be largely unchanged—the 'a', 'mx', or 'exists' mechanism may be simply substituted for the 'include' mechanism in this case.

Under this variation the behavior of the authorizing DNS server 130 is mostly unchanged, except for its return values. In the cases where the authorizing DNS server 130 indicates that the message is not authenticated, the authorizing DNS server 130 may return an NXDOMAIN code. And instead of returning a target validation record, the authorizing DNS server 130 may match the IP address against the target validation record. If the IP address does not match the record, then the authorizing DNS server 130 may return an NXDOMAIN. Alternately, if the IP address is found to match, then the authorizing DNS server 130 may return an A, MX, or A record that includes the IP address.

In one embodiment, the authorizing DNS server 130 is used as a remote SPF auditing tool. SPF resolution occurs on the receiving email system 120, and as such the results of that evaluation may not generally be available to external auditing systems unless special software is installed. If the targeted SPF domain specification has been structured to include both the EHLO name and IP address, the authorizing DNS server 130 may be invoked at least once for each (EHLO name, IP address) combination from which a message is delivered. With this information the resolver can mirror the SPF evaluation carried out by the receiving email system 120 and log the corresponding result.

Example Machine Architecture

Figure 4:
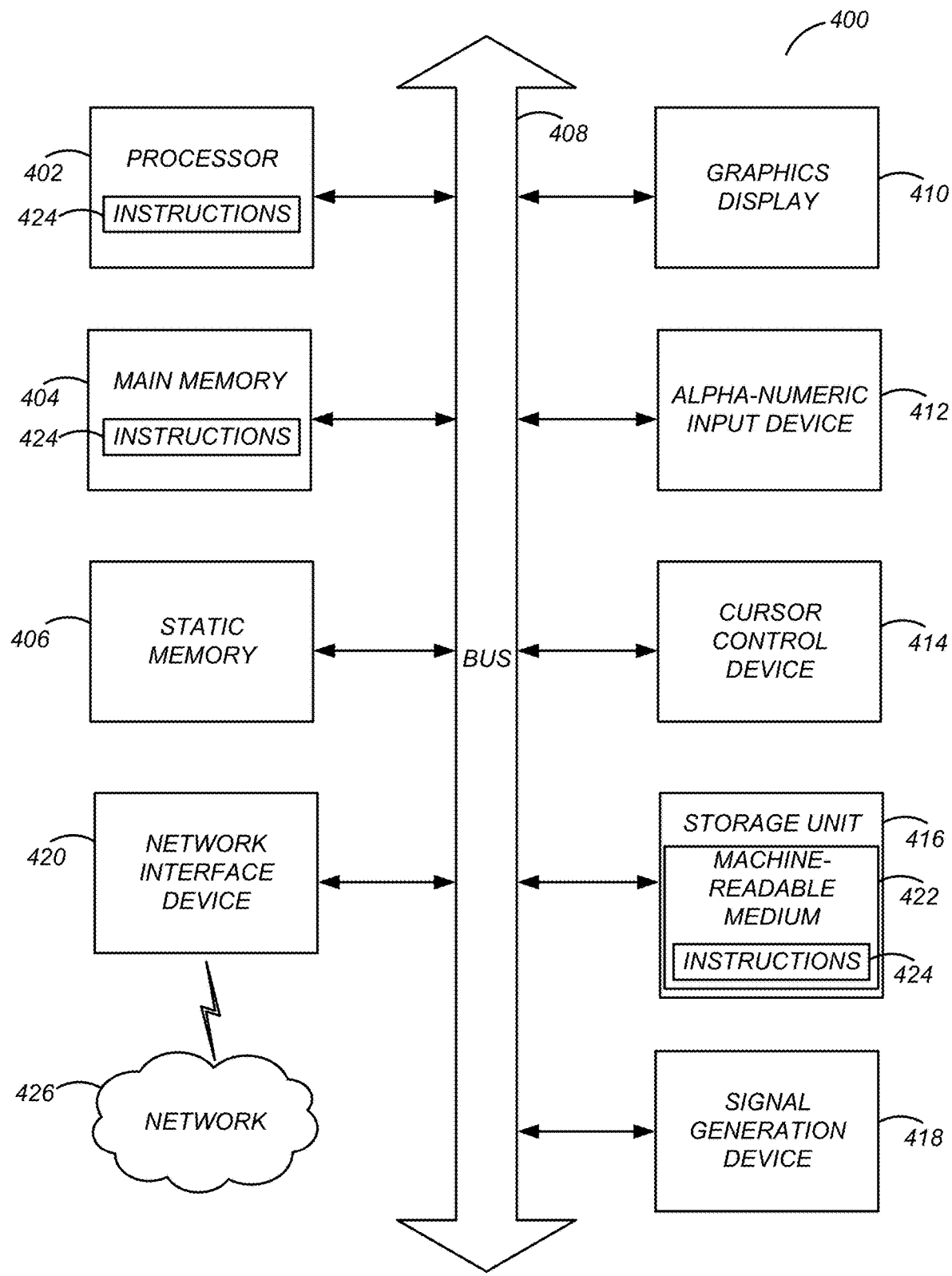
FIG. 4 is a block diagram illustrating components of an example machine able to read instructions from a machine-readable medium and execute them in a processor (or controller).

FIG. 4 is a block diagram illustrating components of an example machine able to read instructions from a machine-readable medium and execute them in a processor (or controller). Specifically, FIG. 4 shows a diagrammatic representation of a machine in the example form of a computer system 400. The computer system 400 can be used to execute instructions 424 (e.g., program code or software) for causing the machine to perform any one or more of the methodologies (or processes) described herein. In alternative embodiments, the machine operates as a standalone device or a connected (e.g., networked) device that connects to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a smartphone, an internet of things (IoT) appliance, a network router, switch or bridge, or any machine capable of executing instructions 424 (sequential or otherwise) that specify actions to be taken by that machine. Further, while only a single machine is illustrated, the term "machine" shall also be taken to include any collection of machines that individually or jointly execute instructions 424 to perform any one or more of the methodologies discussed herein.

The example computer system 400 includes one or more processing units (generally processor 402). The processor 402 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. The computer system 400 also includes a main memory 404. The computer system may include a storage unit 416. The processor 402, memory 404 and the storage unit 416 communicate via a bus 408.

In addition, the computer system 406 can include a static memory 406, a display driver 410 (e.g., to drive a plasma display panel (PDP), a liquid crystal display (LCD), or a projector). The computer system 400 may also include alphanumeric input device 412 (e.g., a keyboard), a cursor control device 414 (e.g., a mouse, a trackball, a joystick, a motion sensor, or other pointing instrument), a signal generation device 418 (e.g., a speaker), and a network interface device 420, which also are configured to communicate via the bus 408.

The storage unit 416 includes a machine-readable medium 422 on which is stored instructions 424 (e.g., software) embodying any one or more of the methodologies or functions described herein. The instructions 424 may also reside, completely or at least partially, within the main memory 404 or within the processor 402 (e.g., within a processor's cache memory) during execution thereof by the computer system 400, the main memory 404 and the processor 402 also constituting machine-readable media. The instructions 424 may be transmitted or received over a network 426 via the network interface device 420.

While machine-readable medium 422 is shown in an example embodiment to be a single medium, the term "machine-readable medium" should be taken to include a single medium or multiple media (e.g., a centralized or distributed database, or associated caches and servers) able to store the instructions 424. The term "machine-readable medium" shall also be taken to include any medium that is capable of storing instructions 424 for execution by the machine and that cause the machine to perform any one or more of the methodologies disclosed herein. The term "machine-readable medium" includes, but not be limited to, data repositories in the form of solid-state memories, optical media, and magnetic media.

Additional Considerations

Using the system and processes described above, a domain owner is able to utilize the services of other third party delivering organizations and their delivering email systems in order to send emails and still have these emails be validated by receiving email systems as being authentic. Instead of updating a variety of email domain validation records, a DNS server may, in a centralized location, generate a simple set of rules depending on the identifying information received from a receiving email system for the delivering email system which sent the email. Furthermore, the receiving email system does not need to query a large number of DNS records that may be present in rules in an email domain validation record. This increases performance and simplifies the management of sending emails via third party agents, while still providing security and preventing fraudulent or suspicious messages from being received.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms, for example, as illustrated in FIGS. 1-5. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process capable of validating email senders through intermediaries via EHLO name and IP address targeting. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A system, comprising:
    an interface configured to receive one or more inputs for indicating that one or more delivering organizations are organizations that deliver emails on behalf of a domain owner that owns an email domain, wherein a particular delivering organization of the one or more delivering organizations delivers emails via one or more IP addresses; and
    a domain name system (DNS) server comprising memory and one or more processors, the DNS server configured to provide one or more DNS responses on behalf of the domain owner, wherein the DNS server, the domain owner, and the particular delivering organization are different entities, wherein the memory comprises instructions that when executed by the one or more processors cause the one or more processors to:
        store a deliverer list associated with the domain owner, the deliverer list comprising one or more delivering organizations;
        maintain a mapping between the particular delivering organization and the one or more IP addresses used by the particular delivering organization;
        serve as an authoritative DNS server for a target domain, wherein the target domain is different from the email domain, the target domain being connected with the email domain through one or more DNS lookup statements;
        receive, from a receiving email system attempting to authenticate an incoming email, a DNS query to the target domain, wherein the DNS query to the target domain is generated after the receiving email system first queried the email domain; and
        return, responsive to the DNS query, a DNS record that comprises at least one of the IP addresses used by the particular delivering organization to deliver emails, wherein the DNS record leads to the receiving email system determining whether to authenticate the incoming email.

2. The system of claim 1, wherein the target domain has a name that includes both the email domain and a domain of an entity associated with the DNS server as part of the name.

3. The system of claim 1, wherein the target domain is referenced in DNS information associated with the email domain via an include directive, the include directive comprising a statement that includes the email domain and a domain of an entity associated with the DNS server.

4. The system of claim 1, wherein the target domain is a subdomain of a domain of an entity associated with the DNS server, and the subdomain has the email domain as a prefix to the domain of the entity.

5. The system of claim 1, wherein the DNS record leads to the receiving email system determining whether to authenticate the incoming email by (i) including an IP address list that includes the one or more IP addresses used by the particular delivering organization to allow the receiving email system to compare a sender IP address to the IP address list or (ii) including a directive that points to another DNS record.

6. The system of claim 1, wherein the DNS record is generated by retrieving the mapping between the particular delivering organization and the one or more IP addresses.

7. The system of claim 1, wherein the deliverer list includes a plurality of delivering organizations, each delivering organization has one or more DNS records to list the delivering organization's own IP addresses, and wherein the plurality of delivering organizations, in total and without the DNS record of the target domain, have a total number of DNS records exceeding a lookup limit.

8. The system of claim 1, wherein the DNS query to the target domain is a second DNS query by the receiving email system, and wherein the receiving email system, upon receiving the incoming email, generates a first DNS query directed to the email domain and, based on an include directive in a DNS response to the first DNS query, the receiving email system generates the second DNS query.

9. The system of claim 1, wherein the interface is a graphical user interface and the interface and the DNS server are operated by the same entity.

10. The system of claim 1, wherein the mapping is constructed by going through existing Sender Policy Framework records of the particular delivering organization to collect the one or more IP addresses used by the particular delivering organization.

11. A system comprising:
one or more processors; and
memory configured to store code comprising instructions, wherein the instructions, when executed by the one or more processors, cause the one or more processors to:
receive one or more inputs for indicating that one or more delivering organizations are organizations that deliver emails on behalf of a domain owner that owns an email domain, wherein a particular delivering organization of the one or more delivering organizations delivers emails via one or more IP addresses;
store a deliverer list associated with the domain owner, the deliverer list comprising one or more delivering organizations;
maintain a mapping between the particular delivering organization and the one or more IP addresses used by the particular delivering organization;
cause a domain name system (DNS) server to serve as an authoritative DNS server for a target domain, wherein the target domain is different from the email domain, wherein the target domain is connected with the email domain through one or more DNS lookup statements, and wherein the DNS server, the domain owner, and the particular delivering organization are different entities;
receive, from a receiving email system attempting to authenticate an incoming email, a DNS query to the target domain, wherein the DNS query to the target domain is generated after the receiving email system first queried the email domain; and
return, responsive to the DNS query, a DNS record that comprises at least one of the IP addresses used by the particular delivering organization to deliver emails, wherein the DNS record leads to the receiving email system determining whether to authenticate the incoming email.

12. The system of claim 11, wherein the target domain has a name that includes both the email domain and a domain of an entity associated with the DNS server as part of the name.

13. The system of claim 11, wherein the target domain is referenced in DNS information associated with the email domain via an include directive, the include directive comprising a statement that includes the email domain and a domain of an entity associated with the DNS server.

14. The system of claim 11, wherein the target domain is a subdomain of a domain of an entity associated with the DNS server, and the subdomain has the email domain as a prefix to the domain of the entity.

15. The system of claim 11, wherein the DNS record leads to the receiving email system determining whether to authenticate the incoming email by (i) including an IP address list that includes the one or more IP addresses used by the particular delivering organization to allow the receiving email system to compare a sender IP address to the IP address list or (ii) including a directive that points to another DNS record.

16. The system of claim 11, wherein the DNS record is generated by retrieving the mapping between the particular delivering organization and the one or more IP addresses.

17. The system of claim 11, wherein the deliverer list includes a plurality of delivering organizations, each delivering organization has one or more DNS records to list the delivering organization's own IP addresses, and wherein the plurality of delivering organizations, in total and without the DNS record of the target domain, have a total number of DNS records exceeding a lookup limit.

18. The system of claim 11, wherein the DNS query to the target domain is a second DNS query by the receiving email system, and wherein the receiving email system, upon receiving the incoming email, generates a first DNS query directed to the email domain and, based on an include directive in a DNS response to the first DNS query, the receiving email system generates the second DNS query.

19. The system of claim 11, wherein the one or more inputs are received from a graphical user interface and the interface and the DNS server are operated by the same entity.

20. The system of claim 11, wherein the mapping is constructed by going through existing Sender Policy Framework records of the particular delivering organization to collect the one or more IP addresses used by the particular delivering organization.

21. A computer-implemented method, comprising:
receiving one or more inputs for indicating that one or more delivering organizations are organizations that deliver emails on behalf of a domain owner that owns an email domain, wherein a particular delivering organization of the one or more delivering organizations delivers emails via one or more IP addresses;
storing a deliverer list associated with the domain owner, the deliverer list comprising one or more delivering organizations;
maintaining a mapping between the particular delivering organization and the one or more IP addresses used by the particular delivering organization;
causing a domain name system (DNS) server to serve as an authoritative DNS server for a target domain, wherein the target domain is different from the email domain, wherein the target domain is connected with the email domain through one or more DNS lookup statements, and wherein the DNS server, the domain owner, and the particular delivering organization are different entities;

receiving, from a receiving email system attempting to authenticate an incoming email, a DNS query to the target domain, wherein the DNS query to the target domain is generated after the receiving email system first queried the email domain; and returning, responsive to the DNS query, a DNS record that comprises at least one of the IP addresses used by the particular delivering organization to deliver emails, wherein the DNS record leads to the receiving email system determining whether to authenticate the incoming email.

22. The computer-implemented method of claim 21, wherein the target domain has a name that includes both the email domain and a domain of an entity associated with the DNS server as part of the name.

23. The computer-implemented method of claim 21, wherein the target domain is referenced in DNS information associated with the email domain via an include directive, the include directive comprising a statement that includes the email domain and a domain of an entity associated with the DNS server.

24. The computer-implemented method of claim 21, wherein the target domain is a subdomain of a domain of an entity associated with the DNS server, and the subdomain has the email domain as a prefix to the domain of the entity.

25. The computer-implemented method of claim 21, wherein the DNS record leads to the receiving email system determining whether to authenticate the incoming email by (i) including an IP address list that includes the one or more IP addresses used by the particular delivering organization to allow the receiving email system to compare a sender IP address to the IP address list or (ii) including a directive that points to another DNS record.

26. The computer-implemented method of claim 21, wherein the DNS record is generated by retrieving the mapping between the particular delivering organization and the one or more IP addresses.

27. The computer-implemented method of claim 21, wherein the deliverer list includes a plurality of delivering organizations, each delivering organization has one or more DNS records to list the delivering organization's own IP addresses, and wherein the plurality of delivering organizations, in total and without the DNS record of the target domain, have a total number of DNS records exceeding a lookup limit.

28. The computer-implemented method of claim 21, wherein the DNS query to the target domain is a second DNS query by the receiving email system, and wherein the receiving email system, upon receiving the incoming email, generates a first DNS query directed to the email domain and, based on an include directive in a DNS response to the first DNS query, the receiving email system generates the second DNS query.

29. The computer-implemented method of claim 21, wherein the one or more inputs are received from a graphical user interface and the interface and the DNS server are operated by the same entity.

30. The computer-implemented method of claim 21, wherein the mapping is constructed by going through existing Sender Policy Framework records of the particular delivering organization to collect the one or more IP addresses used by the particular delivering organization.

* * * * *